United States Patent
Lai et al.

(10) Patent No.: US 10,892,919 B1
(45) Date of Patent: Jan. 12, 2021

(54) DETECTOR AND INTERFERENCE CANCELLATION METHOD FOR SPATIAL MULTIPLEXING FILTER BANK MULTICARRIER WITH OFFSET QUADRATURE AMPLITUDE MODULATION

(71) Applicant: INDUSTRIAL TECHNOLOGY RESEARCH INSTITUTE, Hsinchu (TW)

(72) Inventors: Kuei-Chiang Lai, Tainan (TW); Chi-Jen Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/729,079

(22) Filed: Dec. 27, 2019

(30) Foreign Application Priority Data

Nov. 29, 2019 (TW) .............................. 108143612 A (51) Int. Cl.
  *H04L 1/02* (2006.01)
  *H04L 25/08* (2006.01)
  (Continued)

(52) U.S. Cl.
  CPC .... *H04L 25/03057* (2013.01); *H04L 27/2698* (2013.01)

(58) Field of Classification Search
  CPC ...................... H04L 25/03057; H04L 27/2698
  (Continued)

(56) References Cited

U.S. PATENT DOCUMENTS

| 6,912,250 B1 | 6/2005 | Adireddy et al. |
| 7,436,881 B2 | 10/2008 | Nedic et al. |

(Continued)

FOREIGN PATENT DOCUMENTS

| CN | 101194439 A | 6/2008 |
| EP | 2782304 A1 | 9/2014 |
| TW | 367622 B | 8/1999 |

OTHER PUBLICATIONS

Amr et al. "Channel Equalisation of a MIMO FBMC/OQAM System Using a Polynomial Matrix Pseudo-Inverse", IEEE Sensor Array and Multichannel Signal Processing Workshop, 2018, pp. 568-572.*

(Continued)

*Primary Examiner* — Tesfaldet Bocure
(74) *Attorney, Agent, or Firm* — Birch, Stewart, Kolasch & Birch, LLP (57) ABSTRACT

A detector and an interference cancellation method for a spatial multiplexing filter bank multicarrier with offset quadrature amplitude modulation (SM-FBMC/OQAM) system are provided. The detector includes a decision unit, an inter-symbol feedback filtering unit and an inter-antenna feedback filtering unit. The decision unit is configured to receive a plurality of reception signals corresponding to a subchannel and a plurality of reception antennas to output a decision signal corresponding to the subchannel and a transmission antenna. The inter-symbol feedback filtering unit is configured to feed back the decision signal corresponding to the subchannel and the transmission antenna to eliminate an inter-symbol interference (ISI). The inter-antenna feedback filtering unit is configured to feed back a decision signal corresponding to the subchannel and another transmission antenna to eliminate an inter-antenna interference (IAI).

20 Claims, 7 Drawing Sheets

(51) Int. Cl.
*H04L 25/03* (2006.01)
*H04L 27/26* (2006.01)

(58) Field of Classification Search
USPC .................. 375/233, 285, 267, 347, 346
See application file for complete search history.

(56) References Cited

U.S. PATENT DOCUMENTS

| | | | |
|---|---|---|---|
| 9,806,699 B2 | 10/2017 | Bulzacchelli et al. | |
| 2006/0159196 A1* | 7/2006 | Kwun | H04L 25/03006 375/267 |
| 2012/0219051 A1* | 8/2012 | Yin | H04L 25/03159 375/229 |
| 2012/0314757 A1 | 12/2012 | Bulzacchelli et al. | |
| 2014/0286384 A1 | 9/2014 | Mestre Pons et al. | |
| 2016/0080178 A1 | 3/2016 | Chen et al. | |
| 2017/0054539 A1* | 2/2017 | Qian | H04L 27/264 |

OTHER PUBLICATIONS

Baltar et al., "MMSE Subchannel Decision Feedback Equalization for Filter Bank Based Multicarrier Systems", IEEE, 2009, pp. 2802-2805.

Chen et al., "Decision Feedback Equalizers for Spatial Multiplexing Filter Bank Multicarrier with Offset Quadrature Amplitude Modulation", Institute of Computer and Communication Engineering National Cheng Kung University, Thesis for Master of Science, Jul. 2019, 71 total pages.

Farhang-Boroujeny, "OFDM Versus Filter Bank Multicarrier", IEEE Signal Processing Magazine, May 2011, pp. 92-112.

Ihalainen et al., "Channel Equalization for Multi-Antenna FBMC/OQAM Receivers", IEEE Transactions on Vehicular Technology, vol. 60, No. 5, Jun. 2011, pp. 2070-2085.

Ihalainen et al., "Channel Equalization in Filter Bank Based Multicarrier Modulation for Wireless Communications", EURASIP Journal on Advances in Signal Processing, 2007, vol. 2007, Article ID 49389, pp. 1-18.

Ikhlef et al., "Per subchannel equalization for MIMO FBMC/OQAM systems", IEEE, PACRIM 2009, pp. 559-564.

Kofidis et al., "Adaptive BLAST Decision-Feedback Equalizer FOR MIMO-FBMC/OQAM Systems", IEEE, 2010 IEEE 21st International Symposium on Personal Indoor and Mobile Radio Communications, pp. 841-846.

Lai et al., "A Family of MMSE-Based Decision Feedback Equalizers and Their Properties for FBMC/OQAM Systems", IEEE, IEEE Transactions on Vehicular Technology, vol. 68, No. 3, Mar. 2019, pp. 2346-2360.

Mestre et al., "An Asymptotic Approach to Parallel Equalization of Filter Bank Based Multicarrier Signals", IEEE, IEEE Transactions on Signal Processing, vol. 61, No. 14, Jul. 15, 2013, pp. 3592-3606.

Perez-Neira et al., "MIMO Signal Processing in Offset-QAM Based Filter Bank Multicarrier Systems", IEEE Transactions on Signal Processing, vol. 64, No. 21, Nov. 1, 2016, pp. 5733-5762.

Siohan et al., "Analysis and Design of OFDM/OQAM Systems Based on Filterbank Theory", IEEE, IEEE Transactions on Signal Processing, vol. 50, No. 5, May 2002, pp. 1170-1183.

Caus et al., "Transmitter-Receiver Designs for Highly Frequency Selective Channels in MIMO FBMC Systems," IEEE Transactions on Signal Processing, vol. 60, No. 12, Dec. 2012, pp. 6519-6532.

Taiwanese Office Action and Search Report for Taiwanese Application No. 108143612, dated Sep. 15, 2020.

* cited by examiner

DETECTOR AND INTERFERENCE CANCELLATION METHOD FOR SPATIAL MULTIPLEXING FILTER BANK MULTICARRIER WITH OFFSET QUADRATURE AMPLITUDE MODULATION

This application claims the benefit of Taiwan application Serial No. 108143612, filed Nov. 29, 2019, the disclosure of which is incorporated by reference herein in its entirety.

TECHNICAL FIELD

The disclosure relates in general to a detector and an interference cancellation method, and more particularly to a detector and an interference cancellation method for a spatial multiplexing filter bank multicarrier with offset quadrature amplitude modulation (SM-FBMC/OQAM) system.

BACKGROUND

The spatial multiplexing filter bank multicarrier with offset quadrature amplitude modulation (SM-FBMC/OQAM) system is a popular technique for the mobile communication system of future generations. In comparison to the orthogonal frequency division multiplexing (OFDM) system, the SM-FBMC/OQAM system, which has lower secondary lobe in the spectrum and less affects the user of adjacent frequency band, can reduce guard band without employing cyclic prefix (CP), and therefore achieves higher spectrum efficiency. Moreover, the SM-FBMC/OQAM system has a larger tolerance with synchronization error, such as frequency offset, and is more suitable for the communication situation where the users cannot be synchronized.

However, in a frequency selective channel, the reception end of the SM-FBMC/OQAM system is subjected to interferences such as inter-symbol interference (ISI), inter-antenna interference (IAI), and inter-subchannel interference (ICI).

Figure 1:
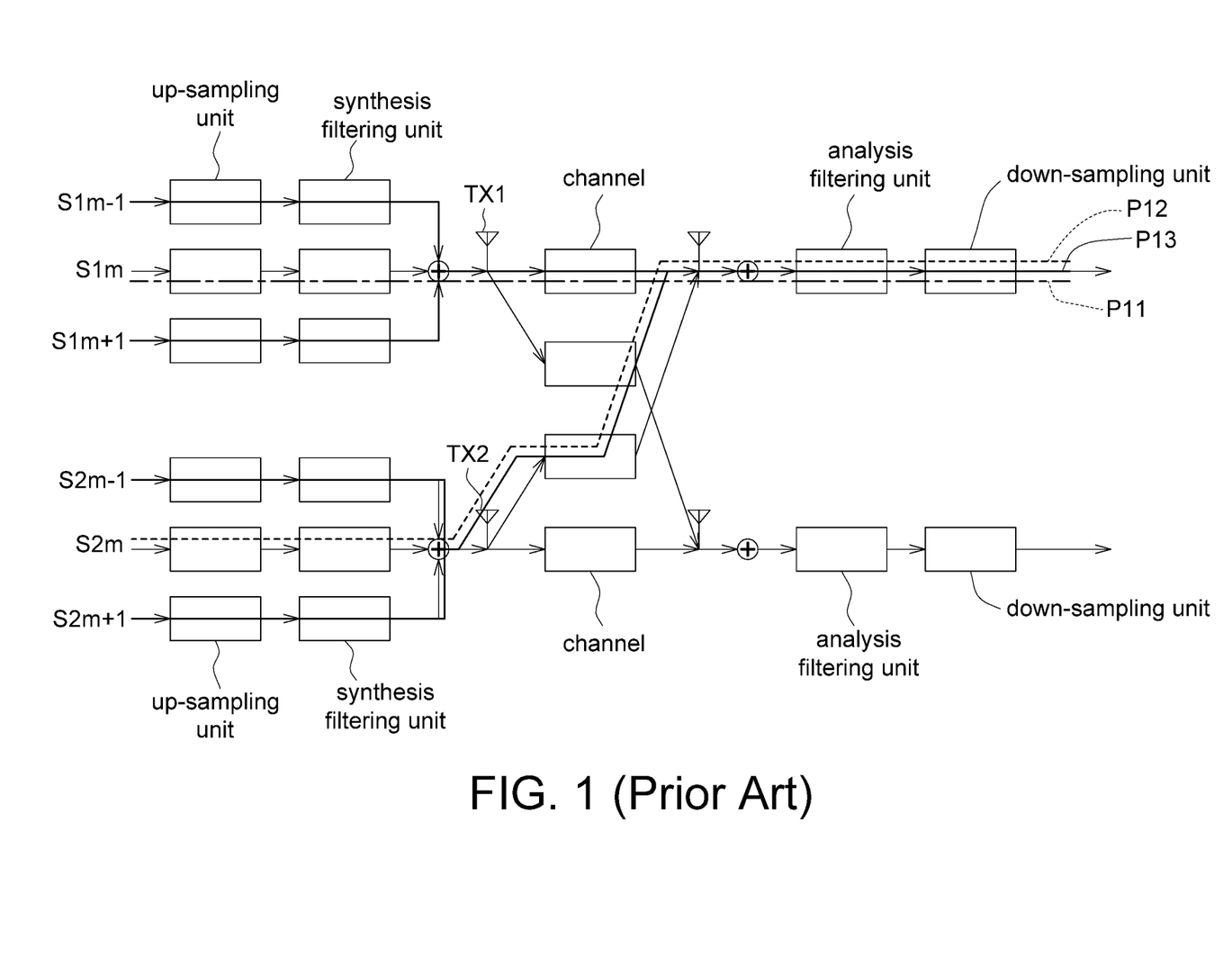
FIG. 1 (prior art) is a schematic diagram of a 2×2 SM-FBMC/OQAM system.

Referring to FIG. 1, a schematic diagram of a 2×2 SM-FBMC/OQAM system is shown. The $1^{st}$ transmission antenna TX1 is used for transmitting transmission signals S1$m$−1, S1$m$, and S1$m$+1 corresponding to the $(m-1)^{th}$, the $m^{th}$, and the $(m+1)^{th}$ subchannels respectively; the $2^{nd}$ transmission antenna TX2 is used for transmitting transmission signals S2$m$−1, S2$m$, and S2$m$+1 corresponding to the $(m-1)^{th}$, the $m^{th}$, and the $(m+1)^{th}$ subchannels respectively. Suppose the transmission signal S1$m$ corresponding to the $m^{th}$ subchannel and the $1^{st}$ transmission antenna TX1 is affected by inter-symbol interference (ISI), inter-antenna interference (IAI), and inter-subchannel interference (ICI).

As indicated in the first path P11 of FIG. 1, the inter-symbol interference (ISI) occurs when the symbols transmitted by the $m^{th}$ subchannel and the $1^{st}$ transmission antenna TX1 pass through the frequency selective channel.

As indicated in the second path P12 of FIG. 1, the inter-antenna interference (IAI) is caused by the transmission signal S2$m$ corresponding to the $m^{th}$ subchannel and the $2^{nd}$ transmission antenna TX2.

As indicated in the third path P13 of FIG. 1, the inter-subchannel interference (ICI) is caused by the transmission signals S1$m$−1 and S1$m$+1 corresponding to the $(m-1)^{th}$ and the $(m+1)^{th}$ subchannels and the $1^{st}$ transmission antenna TX1 and the transmission signals S2$m$−1 and S2$m$+1 corresponding to the $(m-1)^{th}$ and the $(m+1)^{th}$ subchannels and the $2^{nd}$ transmission antenna TX2.

Effectively overcoming the inter-symbol interference (ISI), the inter-antenna interference (IAI), and the inter-subchannel interference (ICI) is needed at the reception end of the SM-FBMC/OQAM system in order to enhance the detection performance.

Currently, most of the detection techniques provided for the SM-FBMC/OQAM system are detectors based on the linear equalizer (LE) technique, such as the ordered successive interference cancellation (OSIC) technique that uses the LE to generate tentative decisions for canceling the interference. In the channel with severe problem of frequency selection, the prior art has poor performance in the detection performance, results in error-rate floor, and generates detection delay.

SUMMARY

The disclosure is directed to a detector and an interference cancellation method for a spatial multiplexing filter bank multicarrier with offset quadrature amplitude modulation (SM-FBMC/OQAM) system.

According to one embodiment of the present disclosure, a detector for an SM-FBMC/OQAM system is provided. The detector includes a decision unit, an inter-symbol feedback filtering unit and an inter-antenna feedback filtering unit. The decision unit is configured to receive a plurality of reception signals corresponding to a subchannel from a plurality of reception antennas to output a decision signal corresponding to the subchannel and a transmission antenna. The inter-symbol feedback filtering unit is configured to feed back the decision signal corresponding to the subchannel and the transmission antenna eliminate the inter-symbol interference (ISI). The inter-antenna feedback filtering unit is configured to feed back a decision signal corresponding to the subchannel and another transmission antenna to eliminate the inter-antenna interference (IAI).

According to another embodiment of the present disclosure, a detector for an SM-FBMC/OQAM system is provided. The detector includes a decision unit, an inter-symbol feedback filtering unit, and at least one inter-subchannel feedback filtering unit. The decision unit is configured to receive a plurality of reception signals corresponding to a subchannel from a plurality of reception antennas to output a decision signal corresponding to the subchannel and a transmission antenna. The inter-symbol feedback filtering unit is configured to feed back the decision signal corresponding to the subchannel and the transmission antenna to eliminate the inter-symbol interference (ISI). The inter-subchannel feedback filtering unit is configured to feed back a decision signal corresponding to another subchannel to eliminate the inter-subchannel interference (ICI).

According to an alternative embodiment of the present disclosure, an interference cancellation method for an SM-FBMC/OQAM system is provided. The interference cancellation method includes the following steps. A plurality of reception signals corresponding to a subchannel are received from a plurality of reception antennas by a decision unit to output a decision signal corresponding to the subchannel and a transmission antenna. The decision signal corresponding to the subchannel and the transmission antenna is fed back by an inter-symbol feedback filtering unit to eliminate the inter-symbol interference (ISI). A decision signal corresponding to the subchannel and another transmission antenna is fed back by an inter-antenna feedback filtering unit to eliminate the inter-antenna interference (IAI).

The above and other aspects of the invention will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
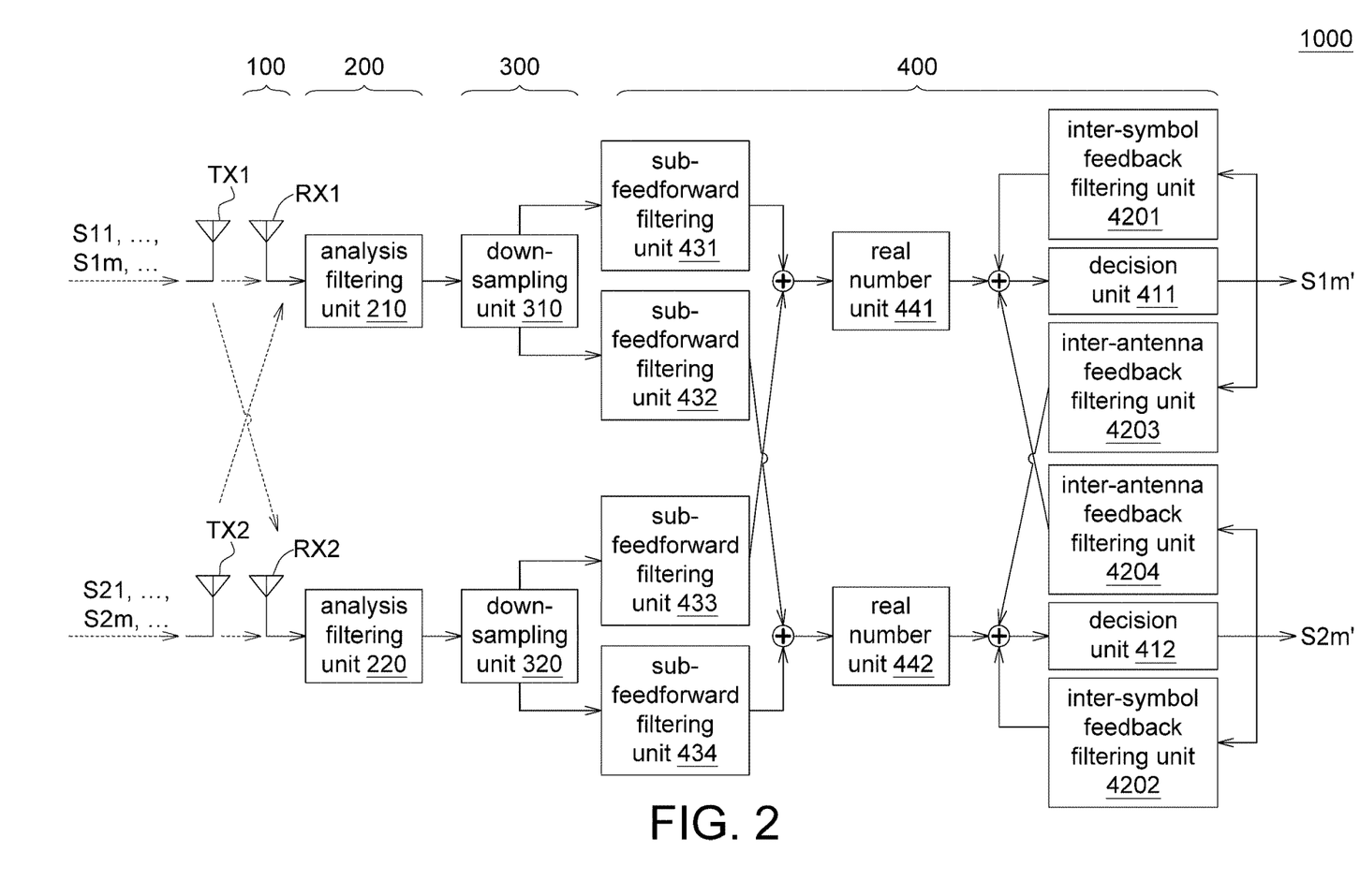
FIG. 2 is a schematic diagram of a reception end for an SM-FBMC/OQAM system according to an embodiment.

Referring to FIG. 2, a schematic diagram of a reception end for an SM-FBMC/OQAM system 1000 according to an embodiment is shown. In the SM-FBMC/OQAM system 1000, the reception antenna module 100 receives transmission signals S11, . . . , S1$m$, . . . corresponding to each subchannel and the 1$^{st}$ transmission antenna TX1 and receives transmission signals S21, . . . , S2$m$, . . . . corresponding to each subchannel and the 2$^{nd}$ transmission antenna TX2. Then, the received signals are firstly processed by the analysis filtering module 200 and the down-sampling module 300 and then are provided to the detector 400 to output a detection result. In the embodiment of FIG. 2, through the design of inter-symbol feedback filtering units 4201 and 4202 and inter-antenna feedback filtering units 4203 and 4204, the detector 400 can eliminate the inter-symbol interference (ISI) and the inter-antenna interference (IAI) to enhance the detection performance of signal.

As indicated in FIG. 2, the reception antenna module 100 includes, for example, adjacent reception antennas RX1 and RX2. The analysis filtering module 200 includes, for example, analysis filtering units 210 and 220. The down-sampling module 300 includes, for example, down-sampling units 310 and 320.

The detector 400 includes, for example, decision units 411 and 412, inter-symbol feedback filtering units 4201 and 4202, inter-antenna feedback filtering units 4203 and 4204, sub-feedforward filtering units 431, 432, 433, and 434, and real number units 441 and 442. The analysis filtering units 210 and 220, the down-sampling units 310 and 320, the decision units 411 and 412, the inter-symbol feedback filtering units 4201 and 4202, the inter-antenna feedback filtering units 4203 and 4204, the sub-feedforward filtering units 431, 432, 433, and 434, and the real number units 441 and 442 can be realized by such as a circuit, a chip, a circuit board, a code or a storage device for storing plural programming codes.

The 1$^{st}$ reception antenna RX1 receives the transmission signal S11 corresponding to the 1$^{st}$ subchannel and the 1$^{st}$ transmission antenna TX1, . . . , the transmission signal S1$m$, corresponding to the m$^{th}$ subchannel and the 1$^{st}$ transmission antenna TX1 and receive the transmission signal S21 corresponding to the 1$^{st}$ subchannel and the 2$^{nd}$ transmission antenna TX2, . . . , the transmission signal S2$m$ corresponding to the m$^{th}$ subchannel and the 2$^{nd}$ transmission antenna TX2. Similarly, the 2$^{nd}$ reception antenna RX2 also receives the transmission signal S11 corresponding to the 1$^{st}$ subchannel and the 1$^{st}$ transmission antenna TX1, . . . , the transmission signal S1$m$ corresponding to the m$^{th}$ subchannel and the 1$^{st}$ transmission antenna TX1 and receive the transmission signal S21 corresponding to the 1$^{st}$ subchannel and the 2$^{nd}$ transmission antenna TX2, . . . , the transmission signal S2$m$ corresponding to the m$^{th}$ subchannel and the 2$^{nd}$ transmission antenna TX2. Thus, each reception signal received from the reception antenna RX1 and that received from the reception antenna RX2 are likely to be subjected to the inter-symbol interference (ISI) and the inter-antenna interference (IAI).

In terms of the transmission signal S1$m$ corresponding to the m$^{th}$ subchannel and the transmission antenna TX1, the decision unit 411 receives the reception signals from all reception antennas RX1, RX2, . . . to output a decision signal S1$m$' corresponding to the m$^{th}$ subchannel and the 1$^{st}$ transmission antenna TX1. The inter-symbol feedback filtering unit 4201 feeds back the decision signal S1$m$' corresponding to the m$^{th}$ subchannel and the transmission antenna TX1 to eliminate the inter-symbol interference (ISI).

As indicated in FIG. 2, the inter-symbol feedback filtering unit 4201 is coupled to an output end and an input end of the decision unit 411. At the input end of the decision unit 411, the inter-symbol interference (ISI) is deducted to eliminate the inter-symbol interference (ISI).

Furthermore, the inter-antenna feedback filtering unit 4204 feeds back the decision signal S2$m$' corresponding to the m$^{th}$ subchannel and the transmission antenna TX2 to eliminate the inter-antenna interference (IAI).

As indicated in FIG. 2, the inter-antenna feedback filtering unit 4204 is coupled to the output end of the decision unit 412 and the input end of the decision unit 411. The decision signal S2$m$' provided by the inter-antenna feedback filtering unit 4204 corresponds to the transmission antenna TX2 instead of the transmission antenna TX1. After the decision signal S2$m$' is fed back to the input end of the decision unit 411, the inter-antenna interference (IAI) is deducted at the input end of the decision unit 411 to eliminate the inter-antenna interference (IAI).

In terms of the transmission signal S2$m$ corresponding to the m$^{th}$ subchannel and the transmission antenna TX2, the decision unit 412 receives reception signals corresponding to the m$^{th}$ subchannel from all reception antennas RX1 and RX2, . . . to output a decision signal S2$m$' corresponding to the m$^{th}$ subchannel and the 2$^{nd}$ transmission antenna TX2. The inter-symbol feedback filtering unit 4202 feeds back the decision signal S2$m$' corresponding to the transmission signal S2ml and the m$^{th}$ subchannel to eliminate the inter-symbol interference (ISI).

As indicated in FIG. 2, the inter-symbol feedback filtering unit 4202 is coupled to an output end and an input end of the decision unit 412. At the input end of the decision unit 412, the inter-symbol interference (ISI) is deducted to eliminate the inter-symbol interference (ISI).

Furthermore, the inter-antenna feedback filtering unit 4203 feeds back the decision signal S1$m$' corresponding to the transmission antenna TX1 to eliminate the inter-antenna interference (IAI).

As indicated in FIG. 2, the inter-antenna feedback filtering unit 4203 is coupled to the output end of the decision unit 411 and the input end of the decision unit 412. The decision signal S1$m$' provided by the inter-antenna feedback filtering unit 4203 corresponds to the transmission antenna TX1 instead of the transmission antenna TX2. After the decision signal S1$m$' is fed back to the input end of the decision unit 412, the inter-antenna interference (IAI) is deducted at the input end of the decision unit 412 to eliminate the inter-antenna interference (IAI).

Figure 3:
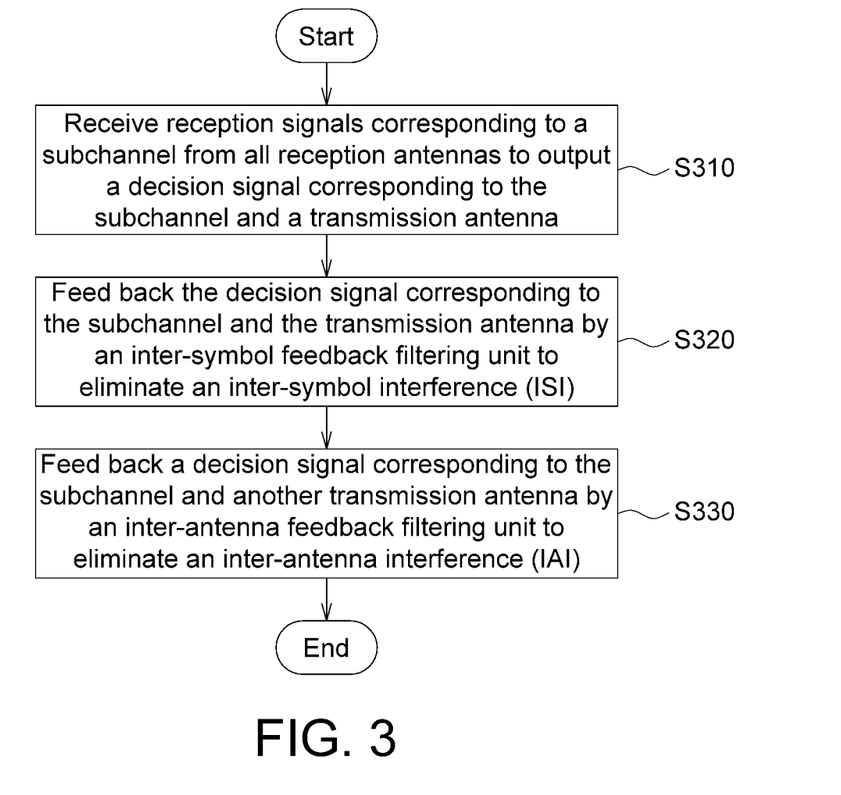
FIG. 3 is a flowchart of an interference cancellation method for an SM-FBMC/OQAM system.

Referring to FIG. 3, a flowchart of an interference cancellation method for an SM-FBMC/OQAM system 1000 is shown. Let the transmission antenna TX1 and the m$^{th}$ subchannel be taken for example. In step S310, reception signals corresponding to the m$^{th}$ subchannel are received from all reception antennas RX1 and RX2, . . . by the decision unit 411 to output a decision signal S1$m$' corresponding to the m$^{th}$ subchannel and the 1$^{st}$ transmission antenna TX1.

Then, the method proceeds to step S320, the decision signal S1$m$' corresponding to the m$^{th}$ subchannel and the transmission antenna TX1 is fed back by the inter-symbol feedback filtering unit 4201 to eliminate the inter-symbol interference (ISI).

After that, the method proceeds to step S330, the decision signal S2$m$' corresponding to the m$^{th}$ subchannel and the transmission antenna TX2 is fed back by the inter-antenna feedback filtering unit 4204 to eliminate the inter-antenna interference (IAI).

Therefore, for the transmission signal S1$m$ corresponding to the m$^{th}$ subchannel and the transmission antenna TX1, the inter-symbol interference (ISI) can be eliminated through the inter-symbol feedback filtering unit 4201, and the inter-antenna interference (IAI) can be eliminated through the inter-antenna feedback filtering unit 4204 to effectively enhance the detection performance.

Similarly, let the transmission antenna TX2 and the m$^{th}$ subchannel be taken for example. In step S310, reception signals corresponding to the m$^{th}$ subchannel are received from all reception antennas RX1 and RX2, . . . by the decision unit 412 to output a decision signal S2$m$' corresponding to the m$^{th}$ subchannel and the 2$^{nd}$ transmission antenna TX2.

Then, the method proceeds to step S320, the decision signal S2$m$' corresponding to the m$^{th}$ subchannel and the transmission antenna TX2 is fed back by the inter-symbol feedback filtering unit 4202 to eliminate the inter-symbol interference (ISI).

After that, the method proceeds to step S330, the decision signal S1m' corresponding to the m$^{th}$ subchannel and the transmission antenna TX1 is fed back by the inter-antenna feedback filtering unit 4203 to eliminate the inter-antenna interference (IAI).

Therefore, for the transmission signal S2$m$ corresponding to the m$^{th}$ subchannel and the transmission antenna TX2, the inter-symbol interference (ISI) can be eliminated through the inter-symbol feedback filtering unit 4202, and the inter-antenna interference (IAI) can be eliminated through the inter-antenna feedback filtering unit 4203 to effectively enhance the detection performance.

The detector 400 of FIG. 2 is referred as a multi-antenna single-band decision feedback equalizer (MA-SB DFE). The MA-SB DFE feeds back the signal corresponding to the same subchannel (referred as SB) of all transmission antennas (referred as MA). Therefore, the detector 400 is referred as an MA-SB DFE.

Figure 4:
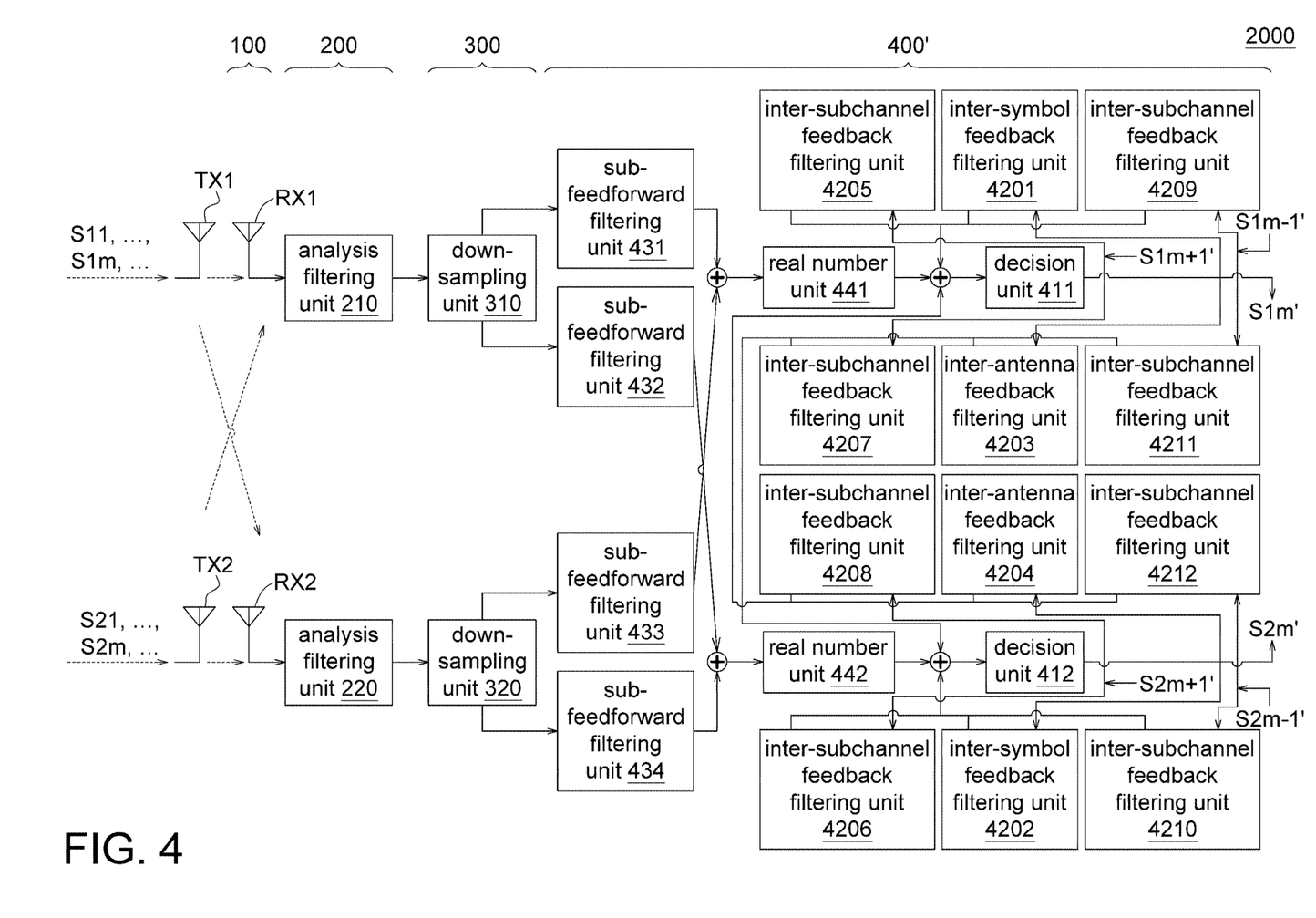
FIG. 4 is a schematic diagram of a reception end for an SM-FBMC/OQAM system according to another embodiment.

Referring to FIG. 4, a schematic diagram of a reception end for an SM-FBMC/OQAM system 2000 according to another embodiment is shown. In the present embodiment, the detector 400' further feeds back the decision signals S1$m$−1', S1$m$+1', S2$m$−1', and S2$m$+1' corresponding to other subchannels through the inter-subchannel feedback filtering units 4205-4212 to eliminate inter-subchannel interference (ICI).

Each of the transmission signals S11, . . . , S1$m$, . . . corresponding to the transmission antenna TX1 and each of the transmission signals S21, . . . , S2$m$, . . . corresponding to the transmission antenna TX2 are likely to be subjected to the inter-subchannel interference (ICI).

In terms of the transmission signal S1$m$ corresponding to the m$^{th}$ subchannel and the transmission antenna TX1, the decision unit 411 receives reception signals corresponding to the m$^{th}$ subchannel from all reception antennas RX1 and RX2, . . . to output a decision signal Sim' corresponding to the m$^{th}$ subchannel and the 1$^{st}$ transmission antenna TX1. The inter-subchannel feedback filtering unit 4205 feeds back the decision signal S1$m$+1' corresponding to the (m+1)$^{th}$ subchannel and the transmission antenna TX1, the inter-subchannel feedback filtering unit 4208 feeds back the decision signal S2$m$+1' corresponding to the (m+1)$^{th}$ subchannel and the transmission antenna TX2, the inter-subchannel feedback filtering unit 4209 feeds back the decision signal S1$m$−1' corresponding to the (m−1)$^{th}$ subchannel and the transmission antenna TX1, and the inter-subchannel feedback filtering unit 4212 feeds back the decision signal S2$m$−1' corresponding to the (m−1)$^{th}$ subchannel and the transmission antenna TX2 to eliminate the inter-subchannel interference (ICI). The inter-subchannel feedback filtering units 4205, 4208, 4209, and 4212 can be realized by such as a circuit, a chip, a circuit board, a code or a storage device for storing plural programming codes.

As indicated in FIG. 4, four inter-subchannel feedback filtering units 4205, 4208, 4209, and 4212 are coupled to the decision unit 411. The inter-subchannel feedback filtering units 4205, 4208, 4209, and 4212 are configured to feed back neighboring decision signals S1$m$+1', S2$m$+1', S1$m$−1', and S2$m$−1'. The inter-subchannel feedback filtering unit 4205 is coupled to the decision signal S1$m$+1' and the input end of the decision unit 411. The inter-subchannel feedback filtering unit 4208 is coupled to the decision signal S2$m$+1' and the input end of the decision unit 411. The inter-subchannel feedback filtering unit 4209 is coupled to the decision signal S1$m$−1' and the input end of the decision unit 411. The inter-subchannel feedback filtering unit 4212 is coupled to the decision signal S2$m$−1' and the input end of the decision unit 411. At the input end of the decision unit 411, the inter-subchannel interference (ICI) can be deducted to eliminate the inter-subchannel interference (ICI).

Figure 5:
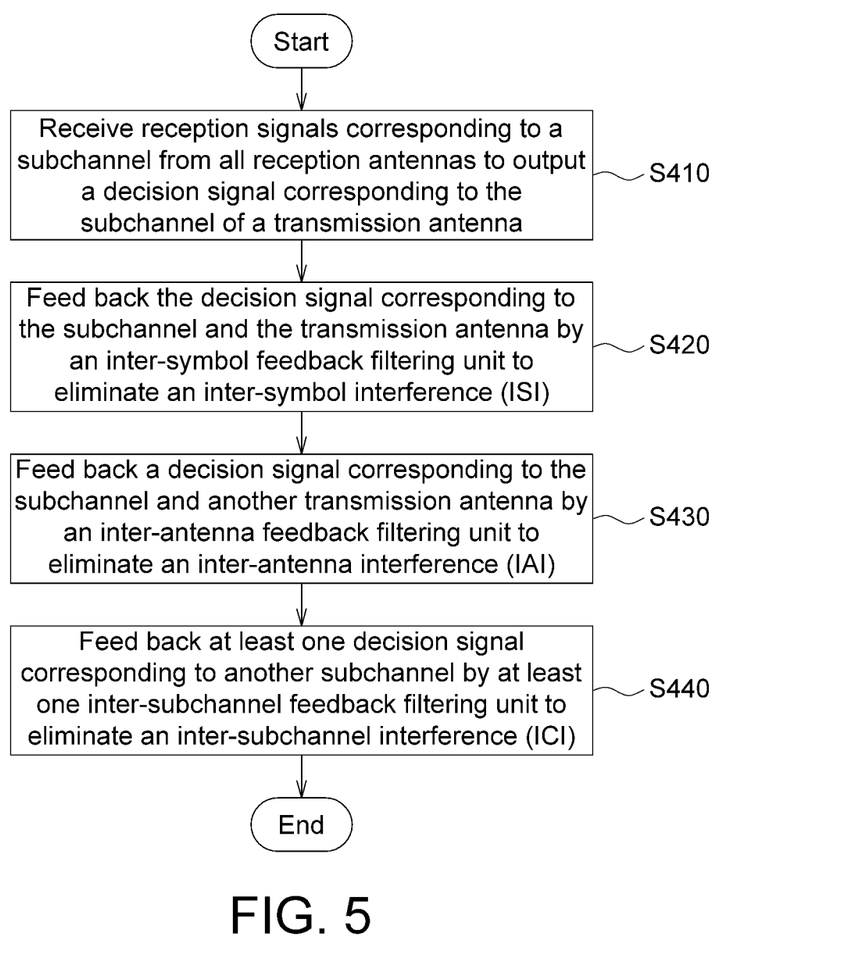
FIG. 5 is a flowchart of an interference cancellation method for an SM-FBMC/OQAM system.

Referring to FIG. 5, a flowchart of an interference cancellation method for an SM-FBMC/OQAM system 2000 is shown. Let the transmission antenna TX1 and the m$^{th}$ subchannel be taken for example. In step S410, reception signals corresponding to the m$^{th}$ subchannel are received from all reception antennas RX1 and RX2, . . . by the decision unit 411 to output a decision signal S1$m$' corresponding to the m$^{th}$ subchannel and the 1$^{st}$ transmission antenna TX1.

Then, the method proceeds to step S420, the decision signal S1$m$' corresponding to the m$^{th}$ subchannel and the transmission antenna TX1 is fed back by the inter-symbol feedback filtering unit 4201 to eliminate the inter-symbol interference (ISI).

After that, the method proceeds to step S430, the decision signal S2$m$' corresponding to the $m^{th}$ subchannel and the transmission antenna TX2 is fed back by the inter-antenna feedback filtering unit 4204 to eliminate the inter-antenna interference (IAI).

Then, the method proceeds to step S440, the decision signals S1$m$+1', S2$m$+1', S1$m$−1', and S2$m$−1' corresponding to the (m+1)$^{th}$ subchannel and the (m−1)$^{th}$ subchannel are fed back by the inter-subchannel feedback filtering units 4205, 4208, 4209, and 4212 to eliminate the inter-subchannel interference (ICI).

Therefore, for the transmission signal S1$m$ corresponding to the $m^{th}$ subchannel and the transmission antenna TX1, the inter-symbol interference (ISI) can be eliminated through the inter-symbol feedback filtering unit 4201, the inter-antenna interference (IAI) can be eliminated through the inter-antenna feedback filtering unit 4204, and the inter-subchannel interference (ICI) can be eliminated through the inter-subchannel feedback filtering units 4205, 4208, 4209, and 4212 to effectively enhance the detection performance.

Similarly, let the transmission antenna TX2 and the $m^{th}$ subchannel be taken for example. In step S410, reception signals corresponding to the $m^{th}$ subchannel are received from all reception antennas RX1 and RX2, . . . by the decision unit 412 to output a decision signal S2$m$' corresponding to the $m^{th}$ subchannel and the $2^{nd}$ transmission antenna TX2.

Then, the method proceeds to step S420, the decision signal S2$m$' corresponding to the $m^{th}$ subchannel and the transmission antenna TX2 is fed back by the inter-symbol feedback filtering unit 4202 to eliminate the inter-symbol interference (ISI).

After that, the method proceeds to step S430, the decision signal S1$m$' corresponding to the $m^{th}$ subchannel and the transmission antenna TX1 is fed back by the inter-antenna feedback filtering unit 4203 to eliminate the inter-antenna interference (IAI).

Then, the method proceeds to step S440, the decision signals S2$m$+1', S1$m$+1', S2$m$−1', and S1$m$−1' corresponding to the (m+1)$^{th}$ subchannel and the (m−1)$^{th}$ subchannels are fed back by the inter-subchannel feedback filtering units 4206, 4207, 4210, and 4211 to eliminate the inter-subchannel interference (ICI). The inter-subchannel feedback filtering units 4206, 4207, 4210, and 4211 can be realized by such as a circuit, a chip, a circuit board, a code or a storage device for storing plural programming codes.

Therefore, for the transmission signal S2$m$ corresponding to the $m^{th}$ subchannel and the transmission antenna TX2, the inter-symbol interference (ISI) can be eliminated through the inter-symbol feedback filtering unit 4202, the inter-antenna interference (IAI) can be eliminated through the inter-antenna feedback filtering unit 4204, and the inter-subchannel interference (ICI) can be eliminated through the inter-subchannel feedback filtering units 4206, 4207, 4210, and 4211 to effectively enhance the detection performance.

Besides, in comparison to the linear equalizer (LE) technique, the detector 400' of the present embodiment directly performs operation through the decision signals S1$m$−1', S1$m$', S1$m$+1', S2$m$−1', S2$m$', S2$m$+1' of adjacent subchannels without increasing detection delay.

The detector 400' of FIG. 4 is referred as a multi-antenna multi-band decision feedback equalizer (MA-MB DFE). The MA-MB DFE feeds back the signals corresponding to adjacent subchannels (referred as MB) and all transmission antennas (referred as MA). Therefore, the detector 400' is referred as an MA-MB DFE.

Figure 6:
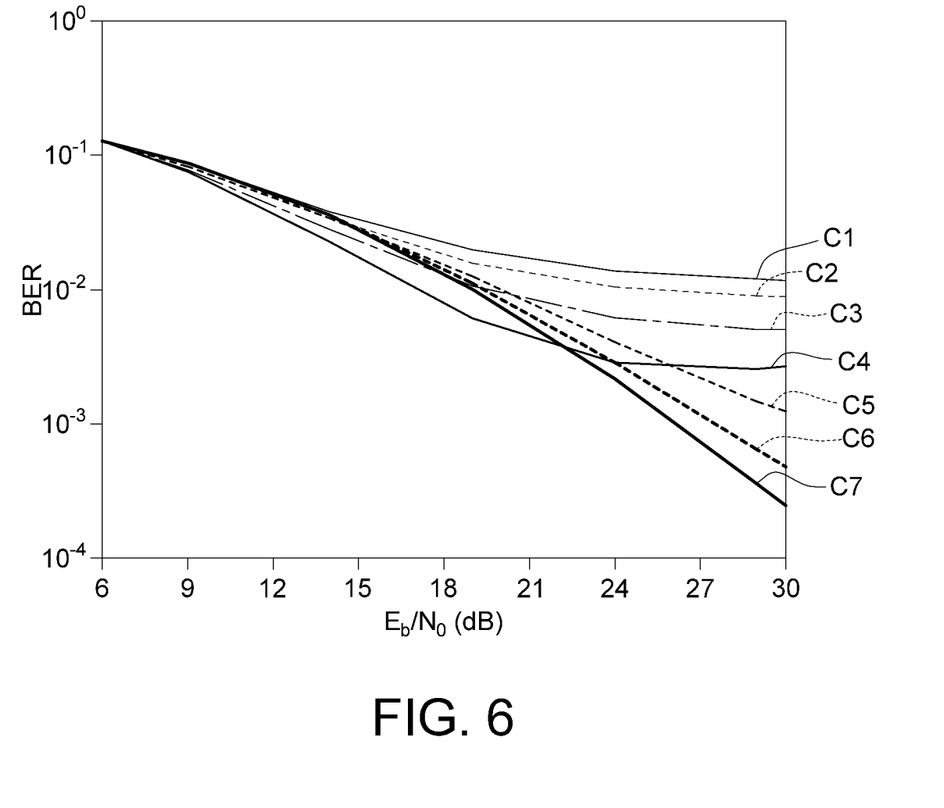
FIG. 6 is a performance curve chart of various detectors.

Referring to FIG. 6, a performance curve chart of various detectors is shown. The performance curve C1 is a performance curve of a detector adopting the linear equalizer (LE) technique. The performance curve C2 is a performance curve of a detector adopting successive interference cancellation (SIC) technique. The performance curve C3 is a performance curve of a detector adopting ordered successive interference cancellation (OSIC) technique. The performance curve C4 is a performance curve of a detector adopting two-stage ordered successive interference cancellation (TS-OSIC) technique. The performance curve C5 is a performance curve of a detector adopting single-antenna single-band decision feedback equalizer (SA-SB DFE) technique. The performance curve C6 is a performance curve of a detector 400 adopting MA-SB DFE technique. The performance curve C7 is a performance curve of a detector 400' adopting the MA-MB DFE technique. As indicated in FIG. 6, the detector adopting the LE technique has a significant error-rate floor, which shows that the linear equalizer technique (LE) has an insufficient efficiency in resolving the inter-symbol interference (ISI), the inter-antenna interference (IAI), and the inter-subchannel interference (ICI). Being subjected to the error-rate floor of the LE technique, the SIC technique and the OSIC technique, which use the LE technique to generate the tentative decisions for canceling the interference, also have a significant error-rate floor.

The observation of the performance curve C6 shows that the MA-SB DFE technique provided in above embodiments can properly resolve the inter-symbol interference (ISI) and the inter-antenna interference (IAI) to enhance the overall performance. That is, the design of eliminating interference through the feedback signal reduces the noise enhancement effect caused by the sub-feedforward filtering units 431, 432, 433, and 434, and therefore enhances the detection performance and eliminates the error-rate floor.

Furthermore, in comparison to the MA-SB DFE technique, the MA-MB DFE technique additionally eliminates the inter-subchannel interference (ICI) and further highlights the improvement in detection performance caused by the elimination of the inter-subchannel interference (ICI) under the circumstance of a higher signal-to-noise ratio (SNR).

Figure 7:
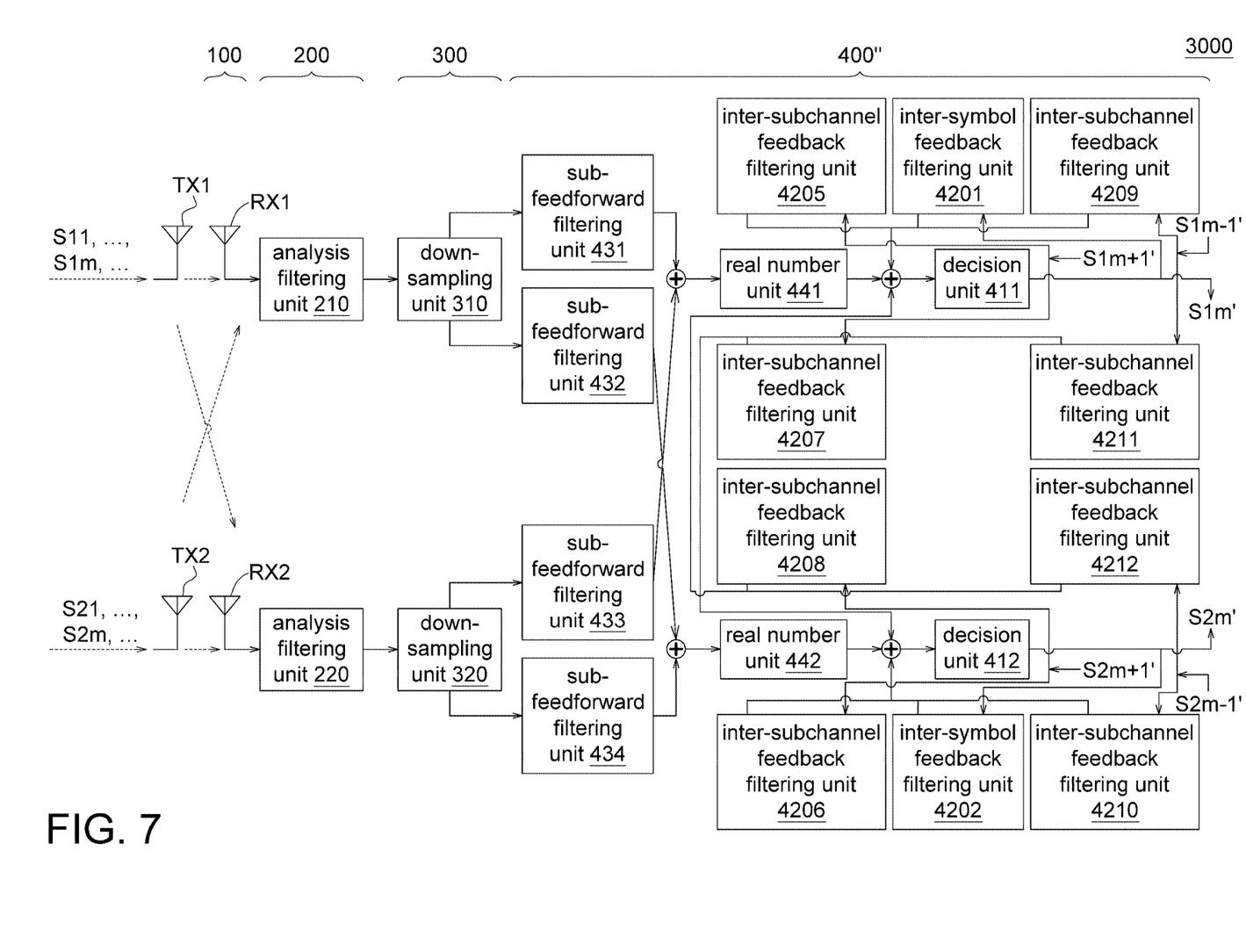
FIG. 7 is a schematic diagram of a reception end for an SM-FBMC/OQAM system according to another embodiment.

In another design apart from the above embodiments, the inter-symbol interference (ISI) and the inter-subchannel interference (ICI) also can be eliminated. Referring to FIG. 7, a schematic diagram of a reception end for an SM-FBMC/OQAM system 3000 according to another embodiment is shown. In the present embodiment, the detector 400" further feeds back the transmission signal corresponding to the same subchannel through the inter-symbol feedback filtering unit 4201 and feeds back the transmission signal corresponding to other subchannel through the inter-subchannel feedback filtering units 4205, 4208, 4209, and 4212 to eliminate the inter-symbol interference (ISI) and the inter-subchannel interference (ICI). Under the circumstance that the inter-antenna interference (IAI) can be neglected, the detector 400" of the present embodiment achieves better detection performance than the detector 400.

In the embodiment of FIG. 7, for the transmission signal S1$m$ corresponding to the $m^{th}$ subchannel and the transmission antenna TX1, the inter-symbol interference (ISI) can be eliminated through the inter-symbol feedback filtering unit 4201, and the inter-subchannel interference (ICI) can be eliminated through the inter-subchannel feedback filtering units 4205, 4208, 4209, and 4212 to effectively enhance the detection performance.

Similarly, for the transmission signal S2m corresponding to the $m^{th}$ subchannel and the transmission antenna TX2, the inter-symbol interference (ISI) can be eliminated through the inter-symbol feedback filtering unit 4202, and the inter-subchannel interference (ICI) can be eliminated through the inter-subchannel feedback filtering units 4206, 4207, 4210, and 4211 to effectively enhance the detection performance.

In above embodiments, the design of feedback filtering units eliminates the inter-symbol interference (ISI) and the inter-subchannel interference (ICI) as well, and therefore effectively enhances the detection performance. Moreover, in comparison to the linear equalizer (LE) technique, the detector 400" of the present embodiment directly performs operation through the decision signals S1m−1', S1m', S1m+1', S2m−1', S2m', and S2m+1' corresponding to adjacent subchannels without increasing detection delay.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A detector for a spatial multiplexing filter bank multicarrier with offset quadrature amplitude modulation (SM-FBMC/OQAM) system, wherein the detector comprises:
    a decision unit configured to receive a plurality of reception signals corresponding to a subchannel from a plurality of reception antennas to output a decision signal corresponding to the subchannel and a transmission antenna;
    an inter-symbol feedback filtering unit configured to feed back the decision signal corresponding to the subchannel and the transmission antenna to the decision unit for eliminating an inter-symbol interference (ISI); and
    an inter-antenna feedback filtering unit configured to feed back a decision signal corresponding to the subchannel and another transmission antenna to the decision unit for eliminating an inter-antenna interference (IAI).

2. The detector according to claim 1, wherein the inter-symbol feedback filtering unit is coupled to an output end and an input end of the decision unit.

3. The detector according to claim 1, wherein the inter-antenna feedback filtering unit is coupled to an output end of another decision unit and an input end of the decision unit.

4. The detector according to claim 3, wherein the decision unit and the another decision unit correspond to two neighboring transmission antennas.

5. The detector according to claim 1, further comprising:
    at least one inter-subchannel feedback filtering unit configured to feed back at least one decision signal corresponding to another subchannel to the decision unit for eliminating an inter-subchannel interference (ICI).

6. The detector according to claim 5, wherein the at least one inter-subchannel feedback filtering unit has a quantity greater than or equal to 2.

7. The detector according to claim 5, wherein the at least one inter-subchannel feedback filtering unit has a quantity of 4.

8. The detector according to claim 5, wherein the subchannel is adjacent to the another subchannel.

9. A detector for an SM-FBMC/OQAM system, comprising:
    a decision unit configured to receive a plurality of reception signals corresponding to a subchannel from a plurality of reception antennas to output a decision signal corresponding to the subchannel and a transmission antenna;
    an inter-symbol feedback filtering unit configured to feed back the decision signal corresponding to the subchannel and the transmission antenna to the decision unit for eliminating an inter-symbol interference (ISI); and
    at least one inter-subchannel feedback filtering unit configured to feed back at least one decision signal corresponding to another subchannel to the decision unit for eliminating an inter-subchannel interference (ICI).

10. The detector according to claim 9, wherein the at least one inter-subchannel feedback filtering unit has a quantity greater than or equal to 2.

11. The detector according to claim 9, wherein the at least one inter-sub channel feedback filtering unit has a quantity of 4.

12. The detector according to claim 9, wherein the subchannel is adjacent to the another subchannel.

13. An interference cancellation method for an SM-FBMC/OQAM system, wherein the method comprises:
    receiving a plurality of reception signals corresponding to a subchannel from a plurality of reception antennas by a decision unit to output a decision signal corresponding to the subchannel and a transmission antenna;
    feeding back the decision signal corresponding to the subchannel and the transmission antenna to the decision unit by an inter-symbol feedback filtering unit to eliminate an inter-symbol interference (ISI); and
    feeding back a decision signal corresponding to the subchannel and another transmission antenna to the decision unit by an inter-antenna feedback filtering unit to eliminate an inter-antenna interference (IAI).

14. The interference cancellation method according to claim 13, wherein the inter-symbol feedback filtering unit is coupled to an output end and an input end of the decision unit.

15. The interference cancellation method according to claim 13, wherein the inter-antenna feedback filtering unit is coupled to an output end of another decision unit and an input end of the decision unit.

16. The interference cancellation method according to claim 15, wherein the decision unit and the another decision unit correspond to two neighboring transmission antennas.

17. The interference cancellation method according to claim 13, further comprising:
    feeding back at least one decision signal corresponding to another subchannel to the decision device by at least one inter-subchannel feedback filtering unit to eliminate an inter-subchannel interference (ICI).

18. The interference cancellation method according to claim 17, wherein the at least one inter-subchannel feedback filtering unit has a quantity greater than or equal to 2.

19. The interference cancellation method according to claim 17, wherein the at least one inter-subchannel feedback filtering unit has a quantity of 4.

20. The interference cancellation method according to claim 17, wherein the subchannel is adjacent to the another subchannel.

* * * * *